March 24, 1970   L. P. STAVRACHE ET AL   3,502,916
COOLING SYSTEM FOR ENCLOSED ELECTRIC MACHINES
Filed Dec. 12, 1967   3 Sheets-Sheet 1

L.P. STAVRACHE
MISU UNGUREANU

INVENTORS

BY *Karl F. Ross*
Attorney

L.P STAVRACHE
MISU UNGUREANU
INVENTORS

BY Karl F. Ross

Attorney

United States Patent Office 3,502,916
Patented Mar. 24, 1970

3,502,916
COOLING SYSTEM FOR ENCLOSED ELECTRIC MACHINES
Leon Paul Stavrache, Calea Bucuresti, bloc E3, and Misu Ungureanu, Strada Infratirii 30, both of Craiova, Rumania
Filed Dec. 12, 1967, Ser. No. 689,930
Claims priority, application Rumania, Dec. 14, 1966, 52,727
Int. Cl. H02k 9/06
U.S. Cl. 310—59                    10 Claims

ABSTRACT OF THE DISCLOSURE

Air-cooling system for enclosed-type electrical machines (e.g. motors and generators), wherein air is circulated through axial ducts in stator and rotor cores, formed by stacking the stator or rotor lamellae with axially registering coextensive openings angularly spaced about the axis of rotation, by means of one or two ventilating fans fixed on the rotor shaft adjacent the bearings; the air-flow paths through the cores are maintained separate within the casing.

---

The present invention relates to an air-cooling system for rotating electrical machines of enclosed construction, e.g. motors ad generators, which are provided with ducts in the region of the stator and rotor through which cooling air is circulated by means of ventilating fans mounted on the rotor shaft.

Several air-cooling systems for enclosed-type electrical machines are known. In one of these systems, the outer casing of the machine acts as a heat exchanger and dissipates a part of the heat generated in the stator due to the iron and copper losses of its core and winding, respectively. The heat in such systems is conducted to the outer casing through ribs and grooves provided in the casing from which it is carried away by air blown over its surface by means of an external fan. The heat generated in the rotor due to the iron and copper losses of its core and winding is carried away by air circulating in the air gap of the machine between stator and rotor; this air stream also takes up the remaining part of the stator heat. A ventilating fan mounted on the rotor shaft provides the necessary air circulation in the air gap. In a second system, the rotor and/or stator is provided with tube sheets. The heat generated in the machine is conducted to the external surfaces of the tube sheets from which it is carried away by the circulating air. Other systems involve similar ventilation arrangements.

An important drawback of the above systems is low cooling efficiency, complicated design and high manufacturing cost.

The principal object of the present invention is to provide an efficient and economical air-cooling system for electrical rotating machines, especially motors and generators, of enclosed construction, i.e. a cooling system which will not permit entry of moisture or solid contaminants with particle size in excess of 1 mm.

We have discovered that it is possible to achieve a surprisingly improved cooling efficiency at low construction cost by providing a rotating electrical machine, e.g. a motor or generator, with a stator core and with a coaxial rotor core made up of stacked lamellae or plates of coextensive configuration and lying in planes perpendicular to the axis of rotation of the rotor, the plates of each core have axially registering angularly equispaced openings, preferably of rectangular outline and coextensive with those of the adjoining plates, which define axially extending ducts in the stator and rotor cores respectively. The openings are provided in addition to the radial slots commonly formed in the inner and outer peripheries of the annular stator and rotor plates and opening at these peripheries to receive the stator and rotor windings. The slotlike openings forming the axial ducts have their major dimensions in the radial direction and are angularly spaced apart by a distance equal to a minor fraction (e.g. ⅓ to ⅐) to the width of the opening. The radial dimension of the opening should be between 1.5 and 5 times the circumferential width.

According to another feature of this invention, the stacked iron lamellae are held between a pair of end rings having passages registering with the axial ducts formed by the registering openings for delivering independent streams of cooling air to these ducts and discharging the streams therefrom at the exit side of each cooling path. The corresponding end rings of the stator and rotor are concentric but spaced with annular clearance, these clearances forming an internal chamber which includes the air gap between stator and rotor; the casing and rotor are preferably provided with cooperating apron or sleeve structures at the opposite ends of the machine which close off this chamber to isolate the windings received therein.

Two embodiments of the invention will now be described with reference to the following drawing in which:

FIG. 3b is a cross-sectional view taken along line IIIb—IIIb of FIG. 3a; and

Figure 1:
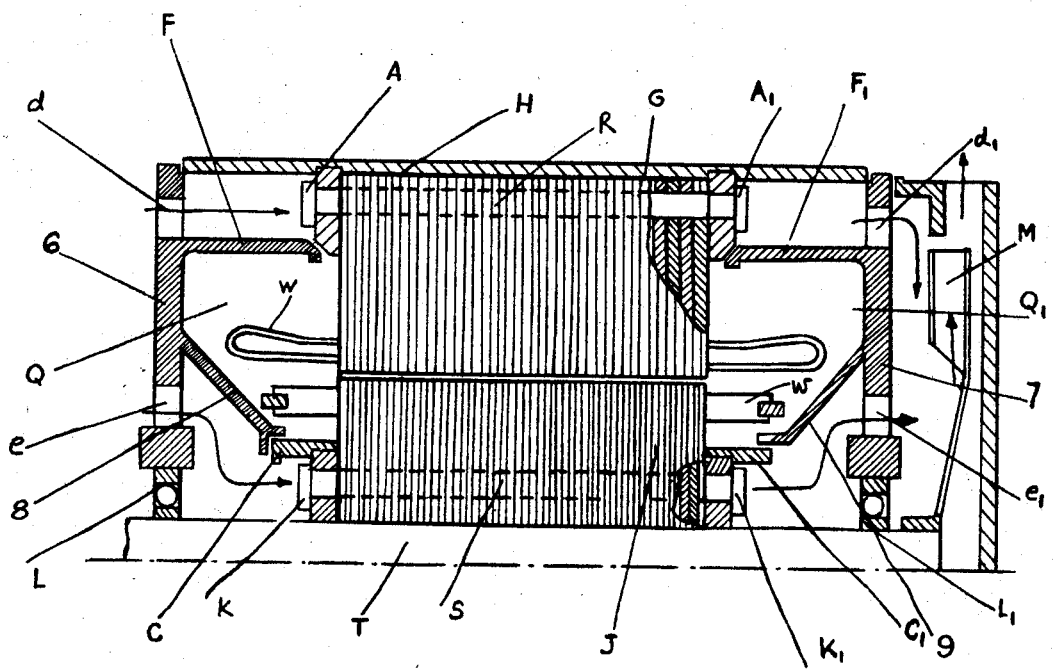
FIG. 1 is a longitudinal cross-sectional view through a machine corresponding to the first embodiment.

The embodiment shown in FIG. 1 is a rotating electrical machine such as a motor which is illustrated diagrammatically and comprises a stator core G mounted in a cylindrical casing H and coaxially surrounds an armature or rotor whose core is shown at J. The stator core G is made up of an axial stack of annular, coextensive identical stator sheets 1 clamped together between two stator pressure or end rings A and $A_1$ on either side of the stator core. The stator winding is represented at W. The rotor core J similarly includes a stack of annular, coextensive identical rotor sheets 2 clamped together between two rotor pressure or end rings K and $K_1$ placed on either side of the rotor core.

Figure 2A:
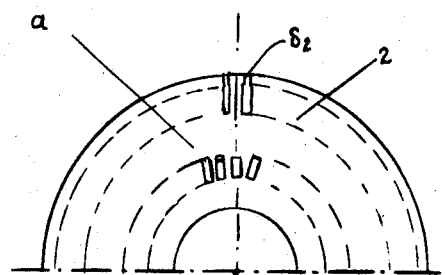
FIG. 2a is an elevational view of a rotor sheet in the device of FIG. 1, drawn to a larger scale.
Figure 2B:
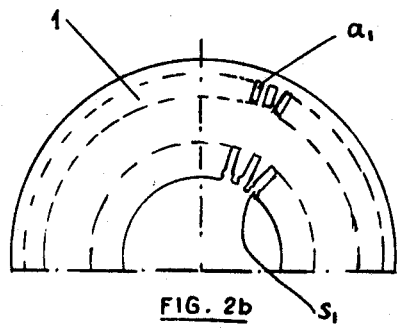
FIG. 2b is an elevational view of a stator sheet of this device in a smaller scale.
Figure 3B:
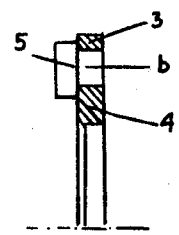
Figure 3A:
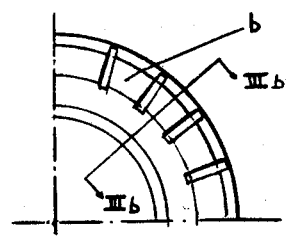
FIG. 3a is an elevational view of a stator pressing or end ring in the scale of FIG. 2b.

Both the stator and rotor sheets have, in addition to the peripheral slots or grooves $S_1$, $S_2$ for receiving the windings W and w, rectangular slotlike openings a and $a_1$ which register axially to form ducts passage of cooling air through the stator and rotor cores respectively. The slotlike openings a and $a_1$ are 10 to 20 mm. in width and 30 to 50 mm. in radial length and are angularly equispaced about the axis of the device in the stator and rotor sheets as shown in FIGS. 2a and 2b; a spacing of 3 to 4 mm. is preferred.

The stator rings A and $A_1$ are each formed of two separate concentric annuluses 3 and 4 connected by radially arranged ribs 5, and are located in an annular space between the cylindrical casing H and end walls 6 and 7 of the housing on either side of the machine. The end walls 6 and 7 are supported by two bearings L and $L_1$ fitted at either end of rotor shaft T. Ribs 5 promote passage of air into and out of the ducts without hindrance.

The rotor pressure rings K and $K_1$ located on either side of the rotor core J, are of a construction similar to the stator pressure rings with concentric rings held together by radial vanes and, besides clamping together the rotor sheets, they also hold in position two cylindrical sleeves C and $C_1$ which form seals with inwardly convergent frustoconical aprons 8 and 9 of the housing walls 6 and 7, thereby preventing the cooling air from entering compartments Q and $Q_1$ which are also bounded by inwardly extending aprons F and $F_1$. Each of the housing walls 6 and 7 are provided with angularly spaced sets of openings $d$ and $e$, and $d_1$ and $e_1$ communicating with stator ducts R and rotor ducts S respectively at either end as shown in FIG. 1. A ventilating fan M, with a multiplicity of nozzlelike blades, is mounted on the rotor shaft T externally of the housing wall 7 induces air flow through the ducts R and S from left to right. The separate air flow paths are represented by the arrows.

Figure 4:
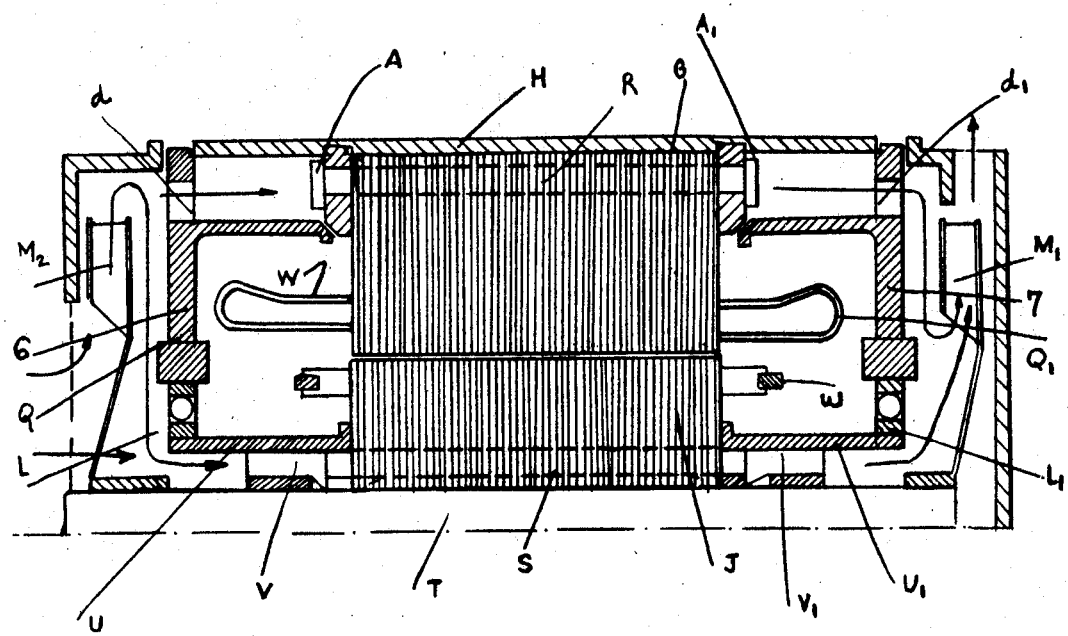
FIG. 4 is a longitudinal cross-sectional view through a machine corresponding to the second embodiment of this invention.

In the embodiment shown in FIG. 4 the problem of sealing is avoided by extending the cylindrical sleeves, as shown at U and $U_1$ to the inner races of bearings L and $L_1$. The bushings are provided with annular openings $v$ and $v_1$ which communicate with the rotor duct from either side. Two ventilating fans $M_1$ and $M_2$ are here mounted as an exhaust fan and as a blower on opposite ends of the rotor shaft T and operate in cascade to provide increased air circulation and greater cooling efficiency. Both units provide high cooling efficiency with smaller overall dimensioning and reduced cost.

The invention described and illustrated is believed to admit of many modifications within the ability of persons skilled in the art, all such modifications being considered within the spirit and scope of the appended claims.

We claim:

1. A rotary electrical machine comprising a housing surrounding an axis, a stator member mounted in said housing and centered on said axis, a rotor member received in said housing and coaxial with said stator member, each of said members being composed of an axial stack of annular coextensive sheets of similar configuration, a stator winding on said stator member and a rotor winding on said rotor member, said housing defining an enclosure for said windings, said sheets of each member having angularly spaced axially registering openings forming axially extending angularly spaced cooling ducts extending through said one of said members, the ducts of said rotor member and said stator member lying inwardly and outwardly of said enclosure, respectively, and ventilating means for inducing a flow of air through said ducts without entering said enclosure.

2. A rotary electrical machine comprising a housing surrounding an axis, a stator member mounted in said housing and centered on said axis, a rotor member received in said housing and coaxial with said stator member, at least one of said members being composed of an axial stack of annular coextensive sheets of similar configuration, said sheets having angularly spaced axially registering openings forming axially extending angularly spaced cooling ducts extending through said one of said members, and ventilating means for inducing a flow of air through said ducts, both said members being composed of respective stacks of said annular sheets having respective coaxially aligned openings, said housing having a pair of end walls defining respective pairs of annular compartments open to the atmosphere and respectively communicating with the axial ducts of said stator and rotor members at the opposite ends thereof, said ventilating means including a fan entrained with said rotor member and disposed in the region of one of said pairs of compartments.

3. An electrical machine as defined in claim 2 wherein said openings in said sheets are of rectangular outline with their major dimensions in radial direction.

4. An electrical machine as defined in claim 3 wherein said openings in each of said sheets have radial lengths between 1.5 and 5 times the width of the opening and are spaced apart by a distance equal to a minor fraction of the width of the opening.

5. An electrical machine as defined in claim 2 wherein the sheets of each of said members are clamped between a respective pair of end rings and are provided with passages communicating with the respective axial ducts.

6. An electrical machine as defined in claim 5 wherein each of said rings is composed of a pair of radially spaced concentric annuluses, and a multiplicity of angularly spaced radially extending ribs securing the respective annuluses together.

7. An electrical machine as defined in claim 5 wherein the end rings at each end of said members define with the respective end walls an annular chamber between said ducts and separated from said compartments, said members having windings received in said chamber, said ventilating means being constructed and arranged to limit the passage of air through said chamber.

8. An electrical machine as defined in claim 2 wherein each of said end walls is provided with a respective fan rotatably entrained with said rotor member, one of said fans being formed as a blower for forcing air axially into the ducts of at least one of said members, the other of said fans being formed as an exhaust fan drawing air from the ducts of at least one of said members.

9. An electrical machine as defined in claim 2 wherein one of said end walls is formed with a compartment receiving said fan and provided with apertures communicating with the ducts of at least one of said members.

10. An electrical machine as defined in claim 9 wherein said one of said end walls is provided with apertures communicating with the ducts of both said members and said fan is formed as an exhaust fan inducing air to flow through said ducts into the compartment containing said fan and is constructed and arranged such that the air streams passing through said machine meet only upon entry into the compartment containing said fan.

References Cited

UNITED STATES PATENTS

| | | | |
|---|---|---|---|
| 1,835,248 | 12/1931 | Suter | 310—63 |
| 1,920,309 | 8/1933 | Hoseason | 310—62 |
| 1,996,460 | 4/1935 | Coates. | |
| 2,970,233 | 1/1961 | Penney | 310—63 |

FOREIGN PATENTS

| | | |
|---|---|---|
| 546,760 | 7/1942 | Great Britain. |
| 985,410 | 3/1965 | Great Britain. |

MILTON O. HIRSHFIELD, Primary Examiner

D. F. DUGGAN Assistant Examiner

U.S. Cl. X.R.

310—62, 63